US009041997B2

(12) United States Patent
Takahashi et al.

(10) Patent No.: US 9,041,997 B2
(45) Date of Patent: May 26, 2015

(54) ELECTRO-CHROMIC DISPLAY ELEMENT, DISPLAY APPARATUS, AND DRIVING METHOD

(75) Inventors: Hiroyuki Takahashi, Kanagawa (JP); Tohru Yashiro, Kanagawa (JP); Koh Fujimura, Tokyo (JP); Akishige Murakami, Miyagi (JP); Shigenobu Hirano, Kanagawa (JP); Yoshihisa Naijo, Kanagawa (JP); Yoshinori Okada, Kanagawa (JP); Kazuaki Tsuji, Kanagawa (JP); Sukchan Kim, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/114,310

(22) PCT Filed: May 15, 2012

(86) PCT No.: PCT/JP2012/062882
§ 371 (c)(1),
(2), (4) Date: Oct. 28, 2013

(87) PCT Pub. No.: WO2012/165185
PCT Pub. Date: Dec. 6, 2012

(65) Prior Publication Data
US 2014/0078569 A1 Mar. 20, 2014

(30) Foreign Application Priority Data

May 31, 2011 (JP) .................................. 2011-121400
Feb. 27, 2012 (JP) .................................. 2012-039801

(51) Int. Cl.
*G02F 1/155* (2006.01)
*G09G 3/38* (2006.01)
(Continued)

(52) U.S. Cl.
CPC ........ *G02F 1/155* (2013.01); *G09G 3/38* (2013.01); *G02F 2201/34* (2013.01);
(Continued)

(58) Field of Classification Search
CPC ........... G02F 1/15; G02F 1/153; G02F 1/155; G02F 1/163; G02F 2201/34; G02F 2201/16; G09G 2300/08; G09G 3/38
USPC .................... 359/265–275; 345/105, 84, 204
See application file for complete search history.

(56) References Cited

U.S. PATENT DOCUMENTS 4,229,080 A  10/1980 Take et al.
7,029,833 B2  4/2006 Takahashi et al.
(Continued)

FOREIGN PATENT DOCUMENTS

JP  52-094148  8/1977
JP  61-014495  4/1986
(Continued)

OTHER PUBLICATIONS

International Search Report Issued Aug. 14, 2012 in PCT/JP2012/002882 filed on May 15, 2012.
(Continued)

*Primary Examiner* — Tuyen Tra
(74) *Attorney, Agent, or Firm* — Cooper & Dunham LLP

(57) ABSTRACT

An electro-chromic display element includes a display electrode 1 provided on a display substrate 1*b* an electro-chromic layer 3 provided on the display electrode 1; multiple opposing electrodes 2 which are provided on an opposing substrate 2*b* and which are arranged to oppose the display electrode 1; an electrolytic layer 4 provided between the display electrode 1 and the multiple opposing electrodes 2; and an erasing electrode 5 placed between the display electrode 1 and the multiple opposing electrodes 2 and which is arranged such that the electro-chromic layer 3 is placed between the third electrode and the display electrode 1.

7 Claims, 13 Drawing Sheets

(51) Int. Cl.
   *G02F 1/163*   (2006.01)
   *G02F 1/157*   (2006.01)

(52) U.S. Cl.
   CPC .... *G02F 2001/1552* (2013.01); *G02F 2201/16* (2013.01); *G09G 2300/08* (2013.01); *G09G 2310/0251* (2013.01); *G02F 1/157* (2013.01); *G02F 1/163* (2013.01)

(56) References Cited

U.S. PATENT DOCUMENTS

| | | |
|---|---|---|
| 7,333,259 B2 | 2/2008 | Hirano et al. |
| 7,474,322 B2 | 1/2009 | Takahashi et al. |
| 7,525,716 B2 | 4/2009 | Hirano et al. |
| 7,663,797 B2 | 2/2010 | Hirano et al. |
| 2004/0241517 A1 | 12/2004 | Shinozaki et al. |
| 2005/0253800 A1 | 11/2005 | Johnson et al. |
| 2010/0309538 A1 | 12/2010 | Tatsuura et al. |
| 2011/0222139 A1 | 9/2011 | Naijo et al. |
| 2011/0309347 A1 | 12/2011 | Okada et al. |
| 2012/0050838 A1 | 3/2012 | Hirano et al. |

FOREIGN PATENT DOCUMENTS

| | | |
|---|---|---|
| JP | 2003-021848 | 1/2003 |
| JP | 2003-121883 | 4/2003 |
| JP | 2005-531025 | 10/2005 |
| JP | 2006-106669 | 4/2006 |
| JP | 2010-033016 | 2/2010 |
| JP | 2012-002835 | 1/2012 |
| WO | WO 2010/126121 A1 | 11/2010 |

OTHER PUBLICATIONS

European Search Report dated Nov. 21, 2014 in corresponding European patent application No. 12 79 2441.3.
Naijoh, Yoshihisa et al., "Multi-Layered Electrochromic Display", http://210.173.215.10/about/company/technology/tech/pdf/EP1-1.pdf, Dec. 7, 2011.

ELECTRO-CHROMIC DISPLAY ELEMENT, DISPLAY APPARATUS, AND DRIVING METHOD

TECHNICAL FIELD

The present invention relates to electro-chromic display elements, and display apparatuses and driving methods using the same.

BACKGROUND ART

Recently, development of electronic paper has enthusiastically been performed.

The electronic paper, which features the use of a display apparatus as paper, calls for characteristics which are different from a related-art display apparatus such as a CRT (cathode ray tube) or a liquid crystal display. For example, it calls for the characteristics that it is a reflective display apparatus, it has a high white reflectance and a high contrast ratio, it can perform a highly fine display, the display is provided with a memory effect, it may be driven with a low voltage, it is thin and light, it is inexpensive, etc. Of these, there is a particularly high demand for a white reflectance and a contrast ratio which are equivalent to paper as the characteristics related to a quality of display.

On the other hand, for the display apparatuses used for the electronic paper, schemes have been proposed such as a scheme using a reflective liquid crystal; a scheme using electrophoresis; and a scheme using phoretic motion of toner. However, in any of the above-described schemes, it is very difficult to perform multi-color displaying while maintaining the white reflectance and contrast ratio. In order to perform multi-color displaying in general, while a color filter is provided, the reflectance decreases since the color filter itself absorbs light. Moreover, as the color filter divides one pixel into three: red (R), green (G), and blue (B), the reflectance of the display apparatus further decreases. When the white reflectance and contrast ratio significantly decrease, viewability becomes very poor, making it difficult to use as electronic paper.

On the other hand, a promising technique for realizing a reflective display apparatus, not providing the color filter as described above, is a scheme using electro-chromic phenomenon (electro-chromism).

The electro-chromism is a phenomenon in which applying a voltage induces reversible oxidation and deoxidation reactions, so that color changes reversibly. An electro-chromic display element is a display apparatus which utilizes color developing/reducing (below called color developing and reducing) of an electro-chromic compound which induces the electro-chromism phenomenon.

The electro-chromic display element is a reflective display apparatus, has a memory effect, and may be driven with a low voltage, so that extensive research and development from material development to device design is being carried out on it as a prospective candidate of a display apparatus technique for use in electronic paper. Moreover, the electro-chromic display element is expected to be a multi-color display apparatus since it may develop various colors according to the structure of the electro-chromic compound.

There are a number of known examples for the multi-color display apparatus which utilize such electro-chromic display elements.

For example, Patent document 1 discloses a multi-color display apparatus using electro-chromic compounds, wherein fine particles of multiple types of electro-chromic compounds are laminated. In the above document, an example is disclosed of a multi-color display apparatus, wherein multiple electro-chromic compounds are laminated. The electro-chromic compounds are polymer compounds with multiple functional groups having different voltages at which color developing is manifested.

Moreover, in Patent document 2, a display apparatus is disclosed, wherein electro-chromic layers are formed in multiple layers on an electrode and multiple colors are developed using differences in voltage and current values necessary for color developing. Patent document 2 discloses an example of a multi-color display apparatus having a display layer formed by laminating or mixing multiple electro-chromic compounds which develop different colors and which have different electric charge amounts required for color developing and threshold voltages at which color is developed.

Moreover, Patent document 3 discloses an electro-chromic display element, wherein multiple display electrodes and corresponding multiple electro-chromic layers are laminated on a display substrate. The electro-chromic display element, which has a high white color level, may develop multiple colors individually in a simple method and provide a color display at a wide color range.

PATENT DOCUMENTS

Patent Document 1 JP2003-121883A
Patent Document 2 JP2006-106669A
Patent Document 3 JP2010-33016A

SUMMARY OF THE INVENTION

Means for Solving the Problems

However, including the inventions disclosed in these Patent documents, the electro-chromic display element is a scheme wherein color developing and reducing of electro-chromic compounds occur with charge movement between display/opposing electrodes, so that display is made. Dispersion of charges in a direction parallel to the electrode face in the charge movement causes color developing even in a non-electrode portion in the vicinity of the electrode end, and developed color may remain, failing to completely undergo color reducing even with a color reducing step. In such a case, the electro-chromic display element may undergo considerable degradation in display quality for a segment display-type display element or a dot-matrix display-type display element, for example.

In light of the above-described problems of the related art, an object of the present invention is to provide an electro-chromic display element, display apparatus, and a driving method that have a superior display quality with no incomplete reducing of developed color.

An electro-chromic display element according to the present invention for solving the above-described problem includes at least a display substrate; one or more display electrodes provided on the display substrate; an electro-chromic layer provided on the display electrode; an opposing substrate; multiple opposing electrodes which are provided on the opposing substrate and which are arranged to oppose the display electrode; and an electrolytic layer provided such that it is placed between the display electrode and the multiple opposing electrodes, the electro-chromic display element further comprising a third electrode which is placed between the display electrode and the multiple opposing electrodes and which is arranged such that the electro-chromic layer is placed between the third electrode and the display electrode.

A display apparatus according to the present invention for solving the above-described problem includes the above-described electro-chromic display apparatus as claimed; a unit which selects the one or more display electrodes; a unit which variably selects one of the third electrode and the multiple opposing electrodes; and a unit which applies a voltage between the selected display electrode and the selected one of the third electrode and the multiple opposing electrodes.

A method of driving the display apparatus according to the present invention for solving the above-described problem is a method of driving the above-described display apparatus, comprising the steps of: selecting the one or more display electrodes; then selecting the multiple opposing electrodes and applying a voltage between the selected opposing electrode and the selected one or more display electrodes, the voltage causing color reducing of the electro-chromic layer corresponding to the selected one or more display electrodes; and further selecting the third electrode and applying a voltage between the selected third electrode and the selected one or more display electrodes, the voltage causing color reducing of the electro-chromic layers corresponding to the selected one or more display electrodes.

According to the electro-chromic display element and the display apparatus and the driving method using the same, applying a voltage between a display electrode and a third electrode that causes color reducing of the electro-chromic layer causes incomplete reducing of developed color to be eliminated, so that a superior display quality is obtained.

Figure 1:
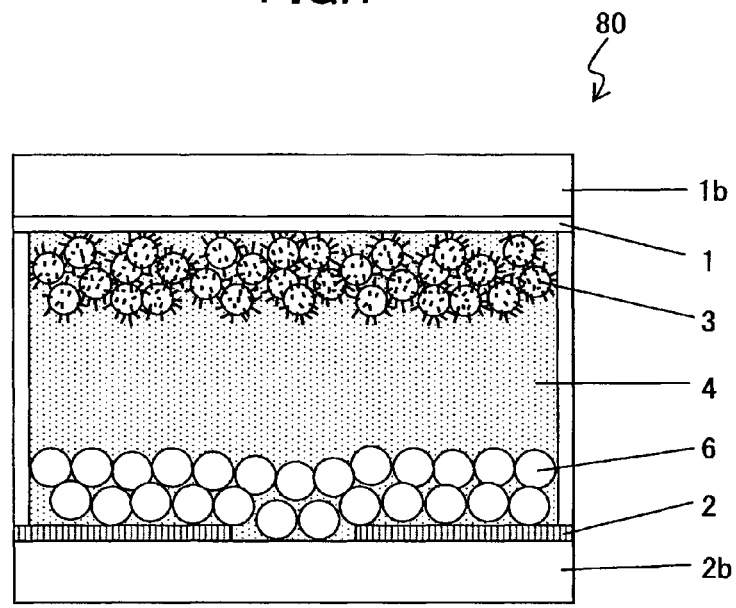
FIG. 1 is a cross-sectional diagram illustrating a first exemplary configuration of a related-art electro-chromic display element.

DESCRIPTION OF THE REFERENCE NUMERALS 1, 1C, 1M, 1Y Display electrode
1$b$ Display substrate
2 Opposing electrode
2$b$ Opposing substrate
2$_{TFT}$ Driving element
3, 3C, 3M, 3Y electro-chromic layer
4 Electrolytic layer
5 Erasing electrode (third electrode)
6 White reflective layer
7 Insulating layer
10, 20, 30, 80, 90 Electro-chromic display element

MODE FOR CARRYING OUT THE INVENTION

In explaining the electro-chromic display element according to the present invention, first an exemplary configuration of a related-art electro-chromic element with respect to the present invention is shown in FIG. 1.

In an electro-chromic display element 80, as shown in FIG. 1, a display substrate 1$b$, which is one substrate, is provided with a display electrode 1 and an electro-chromic layer 3; while an opposing substrate 2$b$, which is the other substrate, is provided with an opposing electrode 2 and a white reflective layer 6 with white pigment particles, forming a structure in which both of them are affixed to each other via an electrolytic layer 4.

Here, in the electro-chromic display element 80, when a voltage is applied to develop color between the display electrode 1 and the opposing electrode 2, it is expected in the first place that only a portion of the electro-chromic layer 3 which corresponds to the position of the opposing electrode 2 develops color. However, dispersion of charges in a direction parallel to the electrode face in the charge movement between the display electrode 1 and the opposing electrode 2 may cause developing of color even to a portion of the electro-chromic layer 3 that is immediately above a portion (a non-electrode portion in the vicinity of the end of the opposing electrode 2, or a gap of the opposing electrode 2) in which there is no opposing electrode 2 due to environmental conditions such as driving conditions, temperature, etc. While the portion (the electro-chromic layer 3) in which color is excessively developed may completely undergo color reducing by applying a voltage in a reverse direction between the display electrode 1 and the opposing electrode 2, it may fail to completely undergo color reducing due to various conditions as described above. An accumulation of such failures may result in undergoing considerable degradation in display quality.

Figure 2:
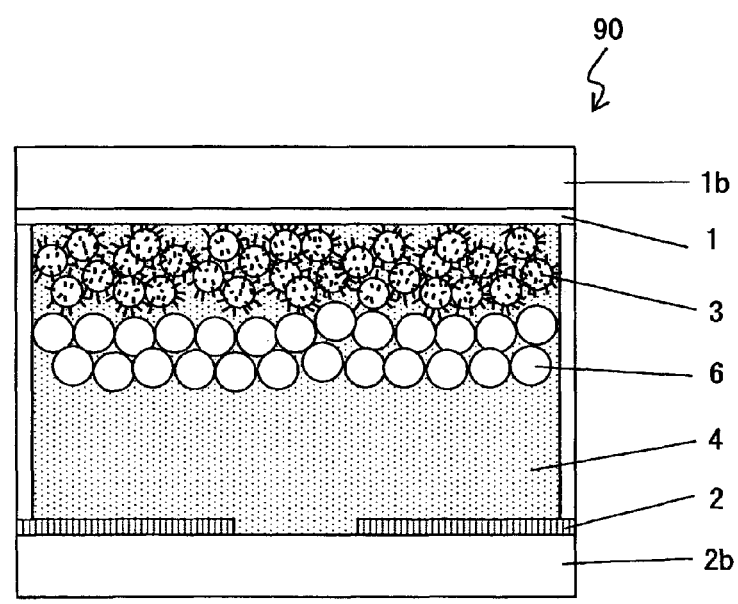
FIG. 2 is a cross-sectional diagram illustrating a second exemplary configuration of the related-art electro-chromic display element.

Such a phenomenon of failing to completely undergo color reducing occurs similarly for the related-art electro-chromic display element 90 as shown in FIG. 2 that has a different position of the white reflective layer 6 relative to the configuration example of FIG. 1.

As a result of eagerly studying to solve the above-described problem, the present inventors have found that it may be solved with the feature of including a third electrode 5 between the display electrode 1 and the opposing electrode 2, and applying a voltage between the display electrode 1 and the third electrode 5 to perform color reducing.

In other words, the electro-chromic display element according to the present invention is an electro-chromic display element which includes at least a display substrate (a display substrate 1b); display electrodes (display electrodes 1, 1C, 1M, 1Y) provided on the display substrate; electro-chromic layers (electro-chromic layers 3, 3C, 3M, 3Y) provided on the display electrodes; an opposing substrate (an opposing substrate 2b); multiple opposing electrodes (opposing electrodes 2) which are provided on the opposing substrate and which are arranged to oppose the display electrode; and an electrolytic layer (an electrolytic layer 4) which is provided such that it is placed between the display electrodes and the multiple opposing electrodes, further including a third electrode (an erasing electrode 5) which is arranged such that the electro-chromic layer is placed between the third electrode and the display electrode.

Figure 3:
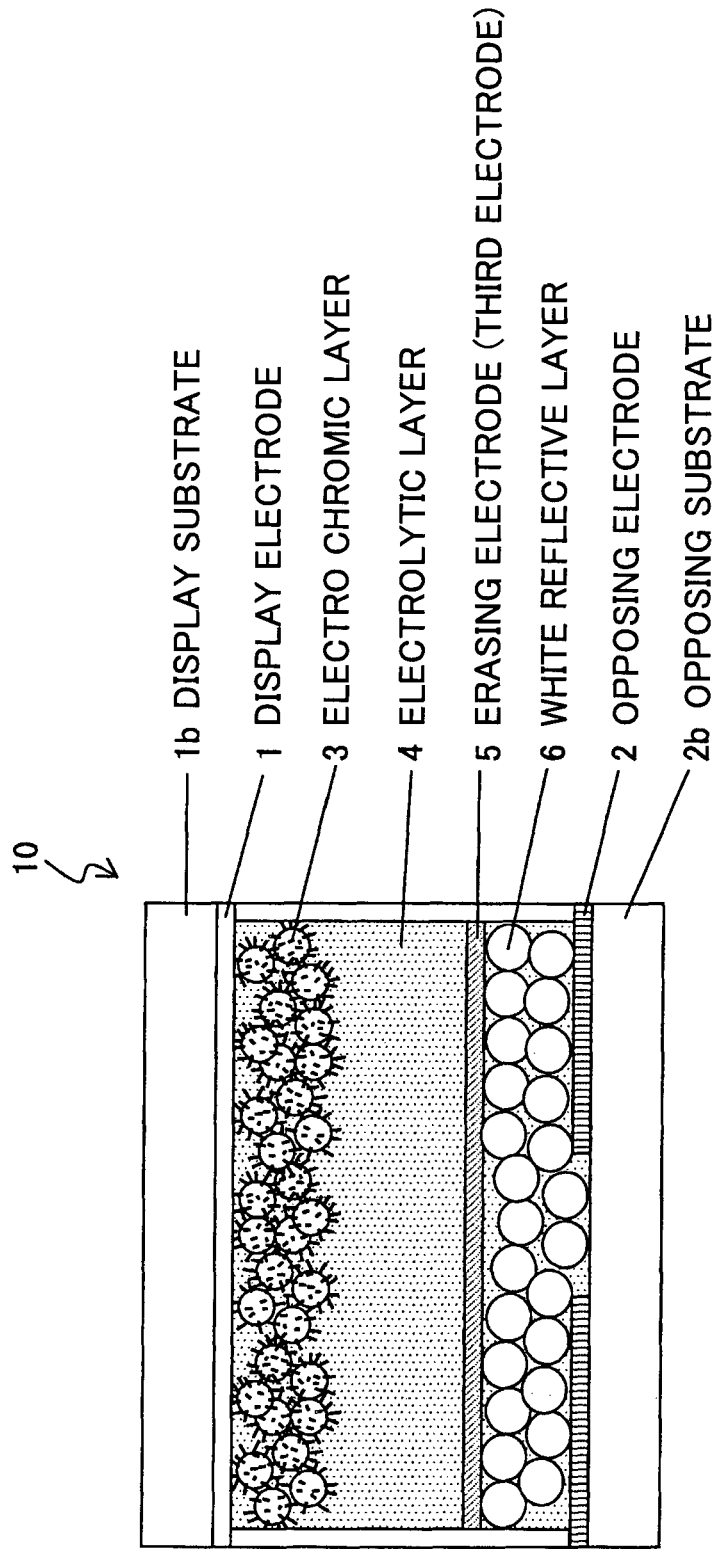
FIG. 3 is a cross-sectional diagram illustrating a first exemplary configuration of an electro-chromic display element according to the present invention.

FIG. 3 illustrates an exemplary configuration of the electro-chromic display element according to the present invention.

As shown in FIG. 3, the configuration of the electro-chromic display element 10, which is almost the same as the exemplary configuration of the related-art element shown in FIG. 1, is different in that the erasing electrode 5 is provided on the white reflective layer 6 as a third electrode such that the electro-chromic layer 3 is placed between the erasing electrode 5 and the display electrode 1.

In FIG. 3, the configuration of the electro-chromic display element is illustrated as a model diagram, so that relationships of magnitude and thickness among the constituting elements substantially differ from the actual relationships. This is the same for FIGS. 4 and 5 of the electro-chromic display element of the present invention as shown below.

Here, the respective constituting elements are described in detail.

First, while the display substrate 1b is not particularly limited as long as it includes a transparent material, a glass substrate, a substrate such as a plastic film, etc., are preferably used.

The display electrode 1 is an electrode for controlling an electric potential relative to the opposing electrode 2, and causes the electro-chromic layer 3 to develop color.

While a material of the display electrode 1 is not particularly limited as long as it is a conductive material, a transparent electrode which includes a transparent material is used since it is necessary to maintain transmittance of light. While materials of a transparent electrode are not particularly limited, a tin-doped indium oxide (below-called ITO); a fluorine-doped tin oxide (below-called FTO); an antimony-doped tin oxide (below-called ATO), etc., are preferably used.

The electro-chromic layer 3 contains electro-chromic materials, for which known electro-chromic compounds such as pigment series, polymer series, metal complex series, metal oxide series, etc., are used.

As pigment series and polymer series electro-chromic compounds, low molecular series organic electro-chromic compounds such as azobenzene series, anthraquinone series, diarylethene series, dihydroprene series, dipyridine series, styryl series, styryl spiropyran series, spiroxazine series, spirothiopyran series, thioindigoid series, tetrathiafulvalene series, terephthalic acid series, triphenylmethane series, triphenylamine series, naphthopyran series, viologen series, pyrazoline series, phenazine series, phenylenediamine series, phenoxazine series, phenothiazine series, phthalocyanine series, fluoranthene series, fulgide series, benzopyran series, metallocene series, etc., may be used. More specifically, it is preferable to include viologen series or dipyridine series compounds. These materials have low color developing and reducing potentials, showing a superior color value. Of these materials, the viologen series are exemplified in JP3955641B, JP2007-171781A, while the dipyridine series are exemplified in JP2007-171781A, JP2008-116718A, etc.

Metallic oxide series compounds include, for example, tungsten oxide, molybdenum oxide, iridium oxide, indium oxide, titanium oxide, nickel oxide, vanadium oxide, Prussian blue, etc.

Metallic complex series electro-chromic compounds include Prussian blue, bis-(terpyridyl)benzene series complex, etc.

Moreover, as the electro-chromic layer 3, as shown in FIG. 3, it is particularly desirable to use a structure which bears organic electro-chromic chemicals in conductive or semi-conductive fine particles. More specifically, the above-described structure is a structure in which ultra fine particles of approximately 5 nm-50 nm in particle diameter are sintered on the electrode surface and the organic electro-chromic chemicals which have polarity bases such as silanol base, carboxyl base, phosphonic acid, etc., are adsorbed on the surface of the ultra-fine particles. The present structure has a high color developing concentration and high color developing and reducing speeds since electrons are efficiently injected into the organic electro-chromic chemicals using a strong surface effect of the ultra-fine particles. Moreover, a high white reflectance may be obtained since a transparent membrane may be formed as a display layer using ultra-fine particles. Furthermore, multiple types of organic electro-chromic chemicals may be borne in the conductive or semi-conductive fine particles.

Conductive or semi-conductive fine particles are not particularly limited, but metal oxides are desirable. As materials, metal oxides having titanium oxide, zinc oxide, tin oxide, zirconiumoxide, ceriumoxide, yttrium oxide, boron oxide, magnesium oxide, strontium titanate, potassium titanate, barium titanate, calcium titanate, calcium oxide, ferrite, hafnium oxide, tungsten oxide, iron oxide, copper oxide, nickel oxide, cobalt oxide, barium oxide, strontium oxide, vanadium oxide, aluminosilicate, etc., as main components are used. Moreover, these metal oxides are used alone, or two or more types may be combined and used. In light of the electrical characteristics such as electrical conductivity, etc., and the physical characteristics such as optical characteristics, etc., displaying which is superior in response speed of color developing and reducing is possible when one type selected from titanium oxide, zinc oxide, tin oxide, zirconium oxide, iron oxide, magnesium oxide, indium oxide, tungsten oxide, or a combination thereof is used. In particular, when titanate oxide is used, displaying which is more superior in response speed of color developing and reducing is possible.

Moreover, while the shape of the conductive or semi-conductive fine particles is not particularly limited, a shape with a large surface per unit volume (below-called a relative surface area) is used to efficiently bear the electro-chromic compound. For example, when the fine particle is a collection of nano-particles, it has a large relative surface area, so that the electro-chromic compound is borne more efficiently, making it possible to provide displaying superior in display contrast ratio of color developing and reducing.

The opposing electrode 2 is an electrode for controlling the electric potential of the display electrode 1 relative to the opposing electrode 2 and causing color developing of the electro-chromic layer 3. While the material of the opposing electrode 2 is not particularly limited as long as it is a conductive material, a transparent conductive film such as ITO, FTO, zinc oxide, etc., or conductive metallic film such as zinc, platinum, etc., carbon or the like may be used.

The electrolytic layer 4 is for moving ions between the display electrode 1 and the opposing electrode 2 to move charges, causing color developing and reducing reactions of the electro-chromic layer 3. As electrolyte materials, alkali metal salts, inorganic ion salts such as alkaline earth metal salts, quarternary ammonium salts or acids, and alkaline supporting salts may be used, for example. More specifically, $LiClO_4$, $LiBF_4$, $LiAsF_6$, $LiPF_6$, $LiCF_3SO_3$, $LiCF_3COO$, KCl, $NaClO_3$, NaCl, $NaBF_4$, NaSCN, $KBF_4$, $Mg(ClO_4)_2$, $Mg(BF_4)_2$, etc. may be included. Moreover, ionic liquid may also be used. More specifically, organic ionic liquid has a molecular structure which demonstrates liquid phase at a wide temperature region including room temperature. Examples of the molecular structure include, as cationic components, aromatic based salt such as imidazole derivatives such as N,N-dimethylimidazole salt, N,N-methylethylimidazole salt, N, N-methylpropylimidazole salt, etc; and pyridinium derivatives such as N,N-dimethylpyridinium salt, N,N-methylpropylpyridinium salt, etc.; or aliphatic quaternary ammonium series such as tetraalkylammonium such as triethylhexylammonium salt, trimethlypropylammonium salt, trimethylhexylammonium salt, etc. Anionic components, which are preferably compounds including fluorine from the point of view of stability in the atmosphere, include $BF_4^-$, $CF_3SC_3^-$, $PF_4^-$, $(CF_3SO_2)2N^-$. An ionic liquid formed of a combination of the cationic components and the anionic components may be used. These may be directly dissolved in the above-described photopolymerized monomers or oligomers and liquid crystal materials, or if dissolution is poor, they may be dissolved in a small amount of catalyst (for example, a propylene carbonate, acetonitrile, γ-butyrolactone, ethylene carbonate, sulfolane, dioxolane, tetrahydrofuran, 2-methyl tetrahydrofuran, dimethyl sulfoxide, dimethoxy ethane, ethoxymethoxy ethane, polyethylene glycol, alcohols, etc.), so that the solution may be used by mixing with the photopolymerized monomers or oligomers and liquid crystal materials.

The white reflective layer 6 is for improving white reflectance when the electro-chromic display element 10 is used as a reflective display apparatus. The white reflective layer 6, which may be provided within the electrolytic layer 4, may be made by forming through dispersing white pigment particles within the electrolyte or applying, onto the opposing electrode 2, resin in which the white pigment particles are dispersed. As materials for the white pigment particles, titanium oxide, aluminum oxide, zinc oxide, silica, cesium oxide, yttrium oxide, etc., are used, for example.

The erasing electrode 5 is a third electrode which is placed between the display electrode 1 and the multiple opposing electrodes 2 such that it is arranged to place the electro-chromic layer 3 between the erasing electrode 5 and the display electrode 1. Moreover, as shown in FIG. 3, the erasing electrode 5 is arranged across the multiple opposing electrodes 2 immediately above the multiple opposing electrodes 2.

While a material of the erasing electrode 5 is not particularly limited as long as it is a conductive material, a transparent electrode which includes a transparent material is used as in the display electrode 1 since it is necessary to maintain transmittance of light.

The electro-chromic display element 10 of the present invention as configured above includes the erasing electrode 5 configured to cover the whole gap portion of the opposing electrode 2, so that an erasing operation of applying a predetermined voltage between the display electrode 1 and the erasing electrode 5 makes it possible to control the electric potential of the display electrode 1 relative to the erasing electrode 5 and to perform color reducing completely with no incomplete color reducing to perform "erasing".

Figure 4:
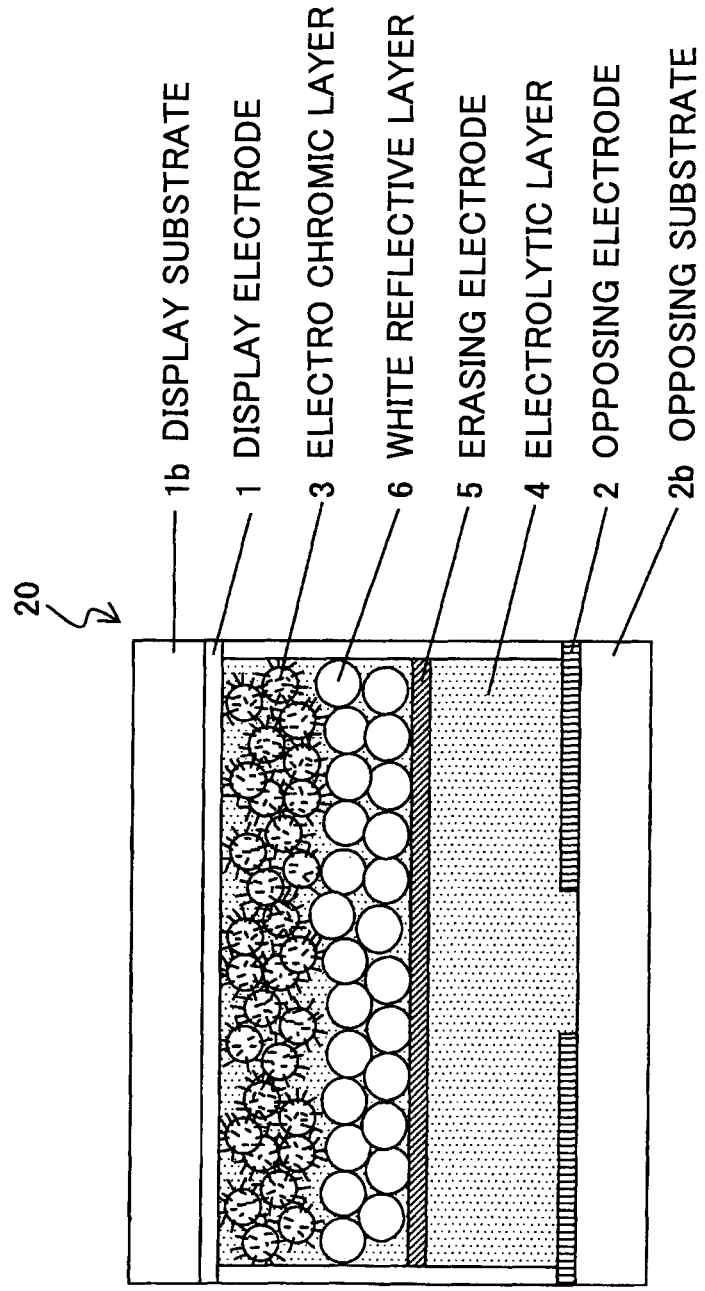
FIG. 4 a cross-sectional diagram illustrating a second exemplary configuration of the electro-chromic display element according to the present invention.

FIG. 4 illustrates another exemplary configuration of the electro-chromic display element according to the present invention.

As shown in FIG. 4, the configuration of the electro-chromic display element 20, which is almost the same as the exemplary configuration of the related-art element shown in FIG. 2, is different in that the erasing electrode 5 is provided as a third electrode such that the electro-chromic layer 3 and the white reflective layer 6 are placed between the erasing electrode 5 and the display electrode 1.

As the electro-chromic display element 20 of the present invention according to the present embodiment also includes the erasing electrode 5 configured to cover the whole gap portion of the opposing electrode 2, an erasing operation of applying a predetermined voltage between the display electrode 1 and the erasing electrode 5 makes it possible to control the potential of the display electrode 1 relative to the erasing electrode 5 and to perform color reducing completely with no incomplete color reducing to perform "erasing".

Figure 5:
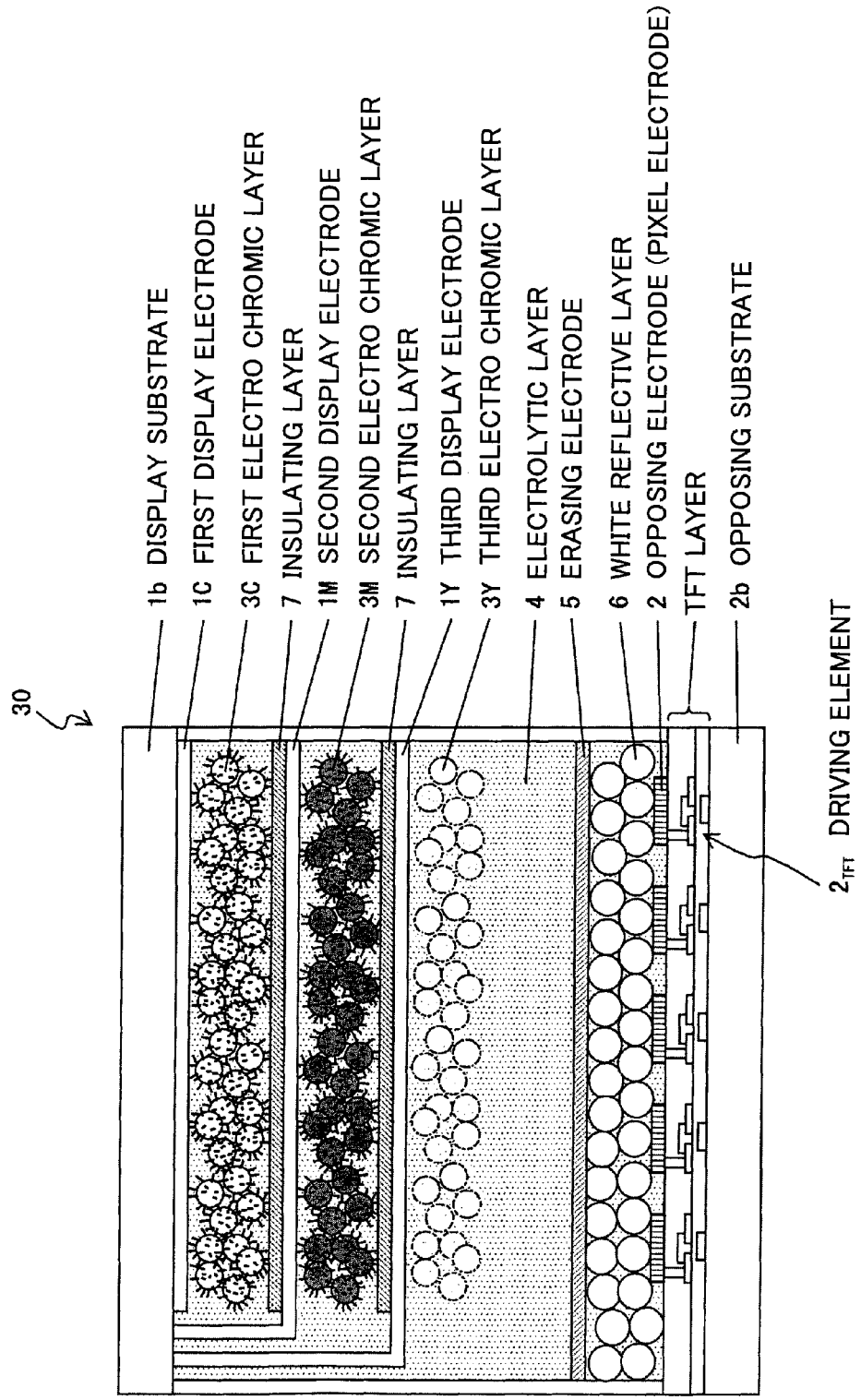
FIG. 5 is a cross-sectional diagram illustrating a third exemplary configuration of the electro-chromic display element according to the present invention.

FIG. 5 illustrates another exemplary configuration of the electro-chromic display element according to the present invention.

In the present exemplary configuration, layer structures (also called electro-chromic display layers) in which the display electrodes 1 and the electro-chromic layers 3 are combined are provided as three laminated layers. More specifically, from the display substrate 1b side, a layer structure of the first display electrode 1C and the first electro-chromic layer 3C; a layer structure of the second display electrode 1M and the second electro-chromic layer 3M; and a layer structure of the third display electrode 1Y and the third electro-chromic layer 3Y are laminated in this order. Here, the three electro-chromic layers 3C, 3M, and 3Y represent configurations which undergo color developing of respectively different colors cyan, magenta, and yellow, making it possible to display in full color.

The configuration and behavior of the respective display electrodes 1C, 1M, 1Y, and the electro-chromic layers 3C, 3M, 3Y are the same as those of the electro-chromic display elements 10 and 20. In other words, the electric potential is controlled by the first display electrode 1C and the opposing electrode 2, so that color developing and reducing of the first electro-chromic layer 3C are controlled. Moreover, the electric potential is controlled by the second display electrode 1M and the opposing electrode 2, so that color developing and reducing of the second electro-chromic layer 3M are controlled, while the electric potential is controlled by the third display electrode 1Y and the opposing electrode 2, so that color developing and reducing of the third electro-chromic layer 3M are controlled.

Moreover, in the present exemplary configuration, in lieu of the opposing electrode 2 in FIGS. 3 and 4, driving elements $2_{TFT}$, which are multiple thin film transistors (TFTs) formed separately from one another, and opposing electrodes 2, which are pixel electrodes formed on the corresponding driving element $2_{TFT}$, are arranged.

Furthermore, the insulating layers 7 are for separating the first electro-chromic layer 3C and the second display electrode 1M and for separating the second electro-chromic layer 3M and the third display electrode if such that they are insulated. In this way, it is made possible to independently control the electric potential relative to the opposing electrodes 2 of the respective first, second, and third display electrodes 1C, 1M, and 1Y, so that it is made possible to independently control color developing and reducing of the respective first, second, and third electro-chromic layers 3C, 3M, and 3Y.

While a material of the insulating layer 7 is not particularly limited as long as it is multi-porous, it is preferably a material with high isolation, high durability, and superior film forming properties. More specifically, it preferably includes at least ZnS. ZnS allows high-speed film forming by sputtering and without causing damage to the electro-chromic layers 3C and 3M. Films with ZnS as a main component include $ZnS-SiO_2$ as well as Zn—S—SiC, ZnS—Si, ZnS—Ge, etc.

Moreover, the erasing electrode 5 is placed between the first display electrode 1C and the multiple opposing electrodes 2 and is arranged such that the first electro-chromic layer 3C is placed between the erasing electrode 5 and the first display electrode 1C, is placed between the second display electrode 1M and the multiple opposing electrodes 2 and is arranged such that the second electro-chromic layer 3M is placed between the erasing electrode 5 and the second display electrode 1M, and is placed between the third display electrode 1Y and the multiple opposing electrodes 2 and is arranged such that the third electro-chromic layer 3Y is placed between the erasing electrode 5 and the third display electrode 1Y, each of which are provided such that a voltage can be applied relative to the display electrodes 1C, 1M, and 1Y.

The white reflective layer 6 is for improving the white reflectance for using it as a reflective display apparatus in the same manner as the electro-chromic display elements 10 and 20 of FIGS. 3 and 4.

With the electro-chromic display element 30 configured as described above, color developing and reducing of the respective electro-chromic layers 3C, 3M, 3Y of cyan, magenta, and yellow may be controlled for each of the pixel electrodes 2 (opposing electrodes) separately formed individually to display a highly-fine full-color image; however, electric charges may disperse to a direction parallel to an electrode face of the opposing electrode 2 as a pixel electrode to cause color developing even in a portion of the respective color electro-chromic layers 3C, 3M, and 3Y that oppose the gap portion between the opposing electrodes 2. Even in this case, it becomes possible to apply a voltage between the erasing electrode 5 and the display electrodes 1C, 1M, and 1Y.

Figure 6:
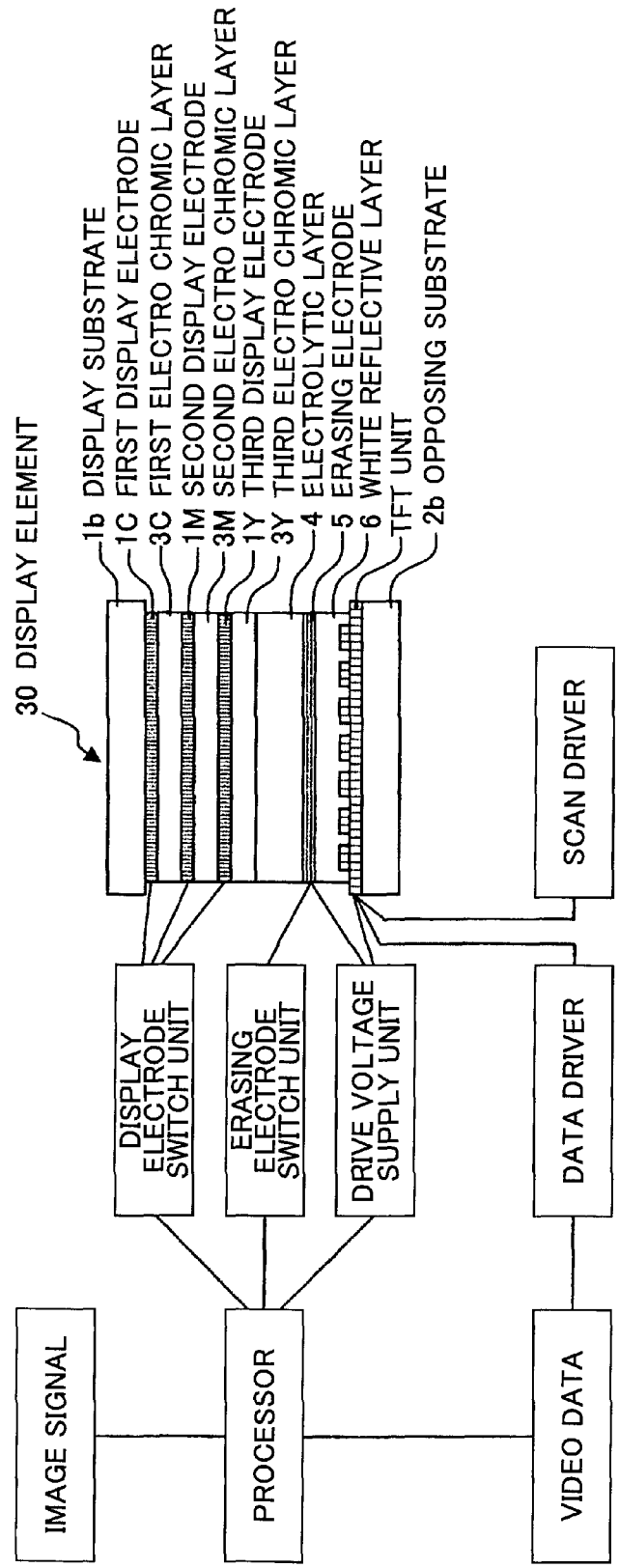
FIG. 6 is a block diagram illustrating an example of a configuration of an active drive display apparatus configured using the electro-chromic display element according to the present invention.

FIG. 6 shows an example of a block diagram of an active driving display apparatus configured using an electro-chromic display element which makes it possible to display a full-color image. A video data signal generated from an image signal is input to a TFT unit via a data driver and actively drives a pixel electrode (an opposing electrode) based on image information to be displayed.

A display electrode switch unit selects a display electrode. A voltage of a driving voltage supply unit is applied between the selected display electrode and the switched-on pixel electrode, so that a predetermined image is formed in an electro-chromic layer corresponding to the display electrode. The respective display electrodes are successively selected to form a predetermined image in the corresponding electro-chromic layer, so that a full-color image is formed.

The erasing electrode switch unit selects the erasing electrode in lieu of the pixel electrode (opposing electrode) of the TFT unit. If the erasing electrode is not selected, the pixel electrode (opposing electrode) is selected. With the erasing electrode switch unit and the above-described display electrode switch unit, a combination of two electrodes that is for applying a voltage for performing color reducing of the electro-chromic display layers may be set in various manners such as between one display electrode and pixel electrodes, between multiple display electrodes and pixel electrodes, between one display electrode and the erasing electrode, or between multiple display electrodes and the erasing electrode.

In the step of erasing a displayed image, it is particularly preferable to erase successively using both a combination which selected the pixel electrodes and a combination which selected the erasing electrode of the above-described combinations of two electrodes. Applying an achromatizing voltage between the display electrode and the pixel electrode causes color reducing of the pixel portion of the respective electro-chromic layers as well as color reducing of the incompletely color reduced inter-pixel portion to some extent. Moreover, the achromatizing voltage may be applied between the display electrode and the achromatizing electrode to erase the incomplete color reducing without applying an excessive voltage to the pixel unit.

Next, it is preferable to erase with only a combination which selected the erasing electrode. In this case, when the incomplete color reducing of the inter-pixel portion, etc., is erased, the achromatizing voltage may be applied excessively to the pixel unit, so that the concentration of the image may decrease somewhat when the image display is made again. However, there is an advantage that an erasing time may be shortened relative to the above-described erasing method.

Relative to the above, of the combinations of the two electrodes, it is difficult for the incomplete color reducing of the inter-pixel portion, etc., to be erased with only the combination which selected the pixel electrode (the same as the related-art configuration in which the erasing electrode does not exist).

Exemplary flow diagrams of color developing and reducing driving of image display and image erasure are shown in FIGS. 7 to 12 for a case of successively erasing using both the combination which selected the image electrode and the combination which selected the erasing electrode.

In FIGS. 7-12, the image display (color developing driving) is common to all, so that the respective display electrodes and a TFT pixel electrode are successively selected and a chromatizing voltage is applied.

Figure 7:
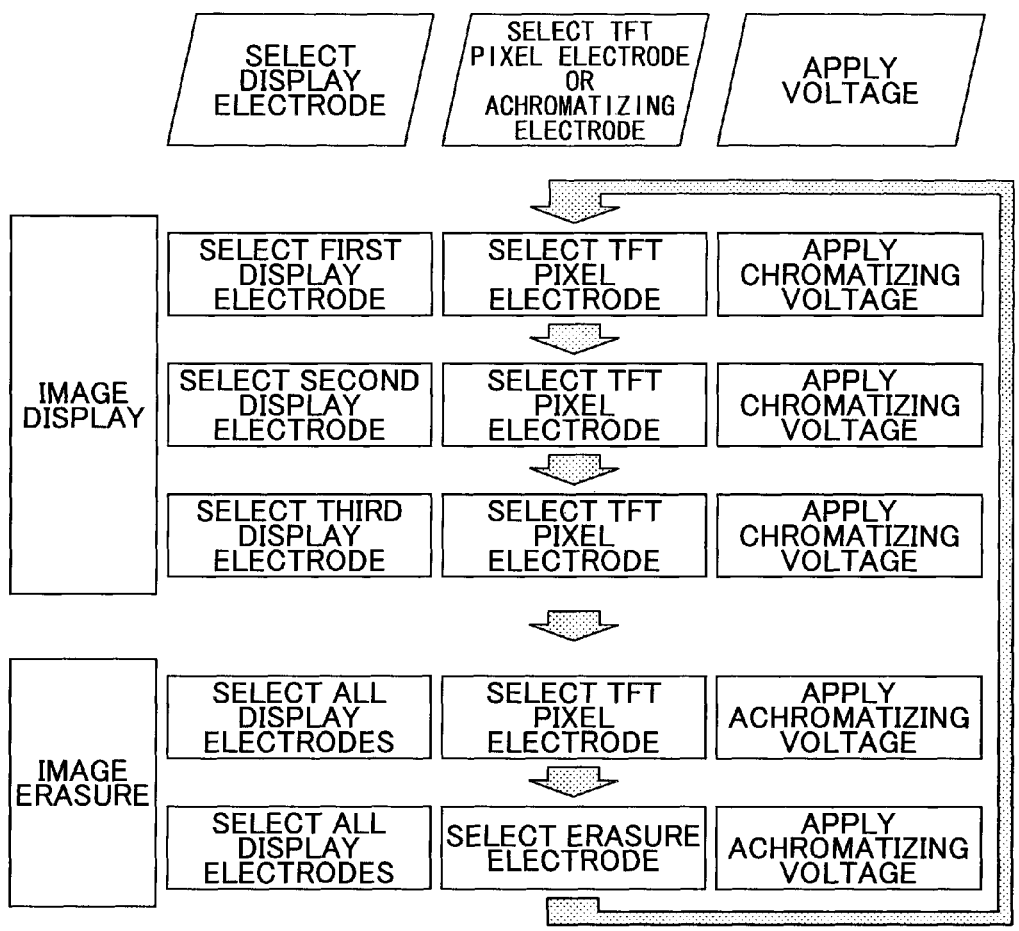
FIG. 7 is a flow diagram illustrating a first example of color developing and reducing driving of image display and image erasure by the active drive display apparatus configured using the electro-chromic display element according to the present invention.

In the image erasure (color reducing driving) in FIG. 7, all the display electrodes and all the TFT pixel electrodes are collectively selected and an achromatizing voltage is applied. Next, all of the display electrodes and the erasing electrode are collectively selected and the achromatizing voltage is applied.

Figure 8:
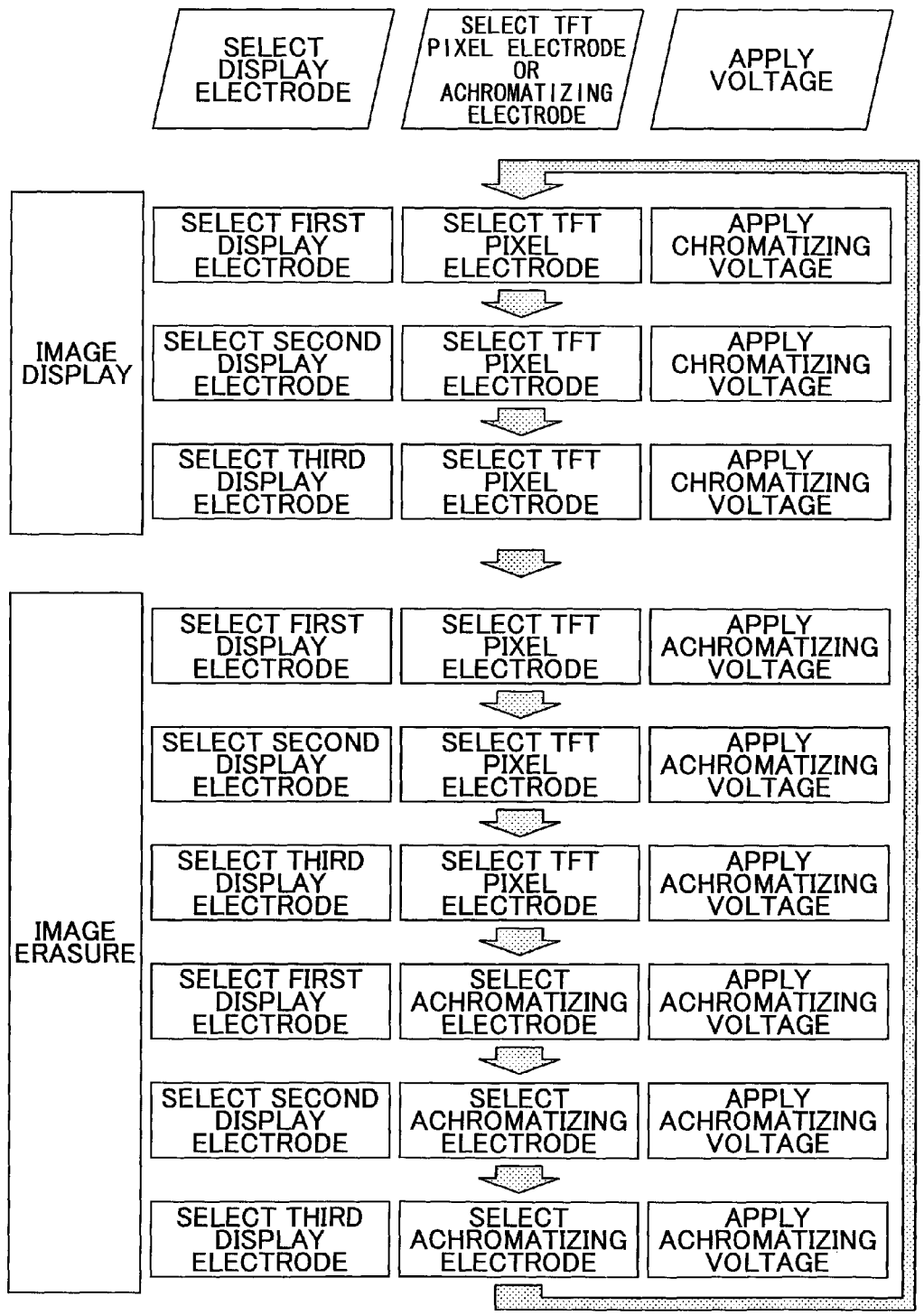
FIG. 8 is a flow diagram illustrating a second example of color developing and reducing driving of image display and image erasure by the active drive display apparatus configured using the electro-chromic display element according to the present invention.

In the image erasure (color reducing driving) in FIG. 8, all the display electrodes and all the TFT pixel electrodes are successively selected and the achromatizing voltage is applied. Next, all of the display electrodes and the erasing electrode are successively selected and the achromatizing voltage is applied.

Figure 9:
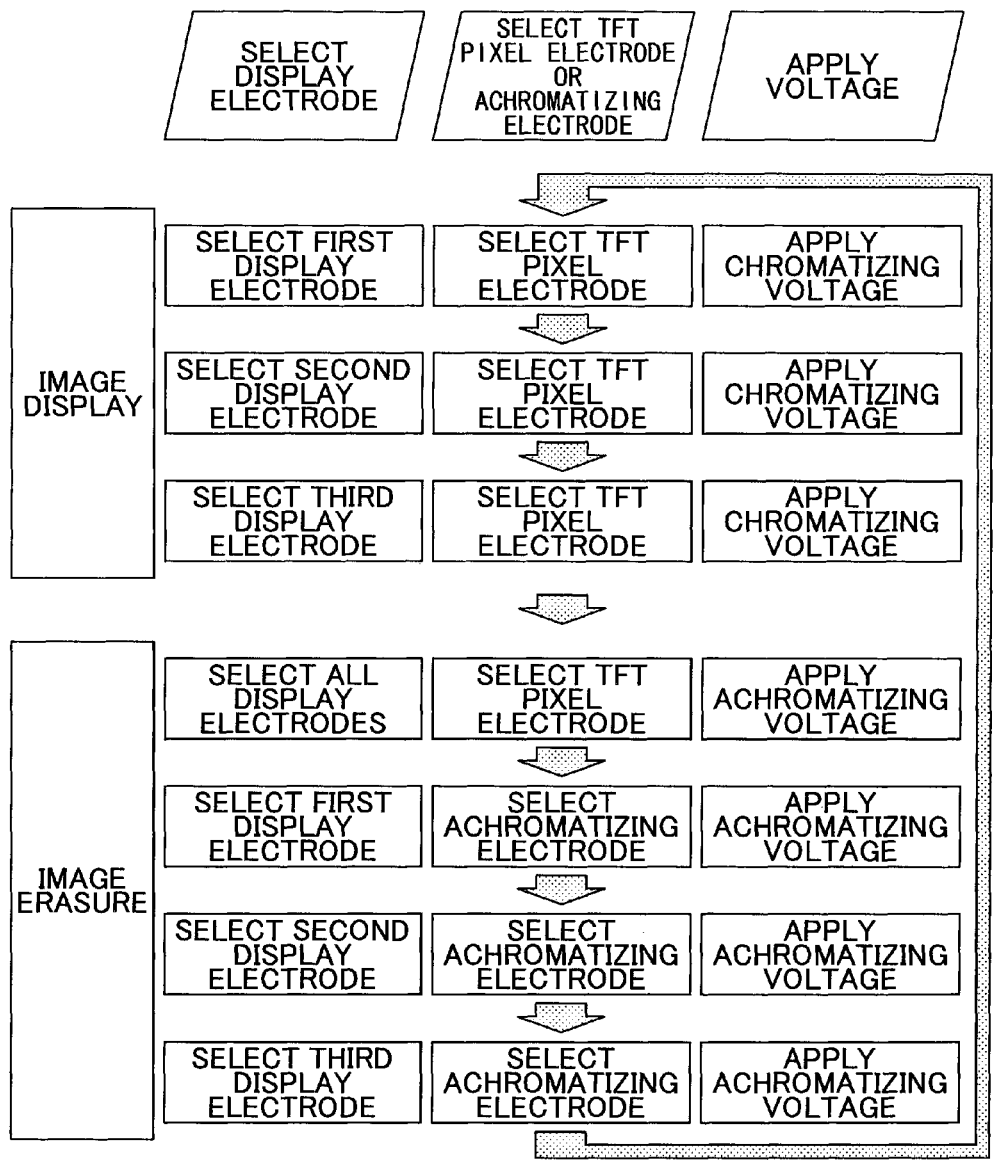
FIG. 9 is a flow diagram illustrating a third example of color developing and reducing driving of image display and image erasure by the active drive display apparatus configured using the electro-chromic display element according to the present invention.

In the image erasure (color reducing driving) in FIG. 9, all the display electrodes and all the TFT pixel electrodes are collectively selected and the achromatizing voltage is applied. Next, besides selecting the erasing electrode, all of the display electrodes are successively selected and the achromatizing voltage is applied.

Figure 10:
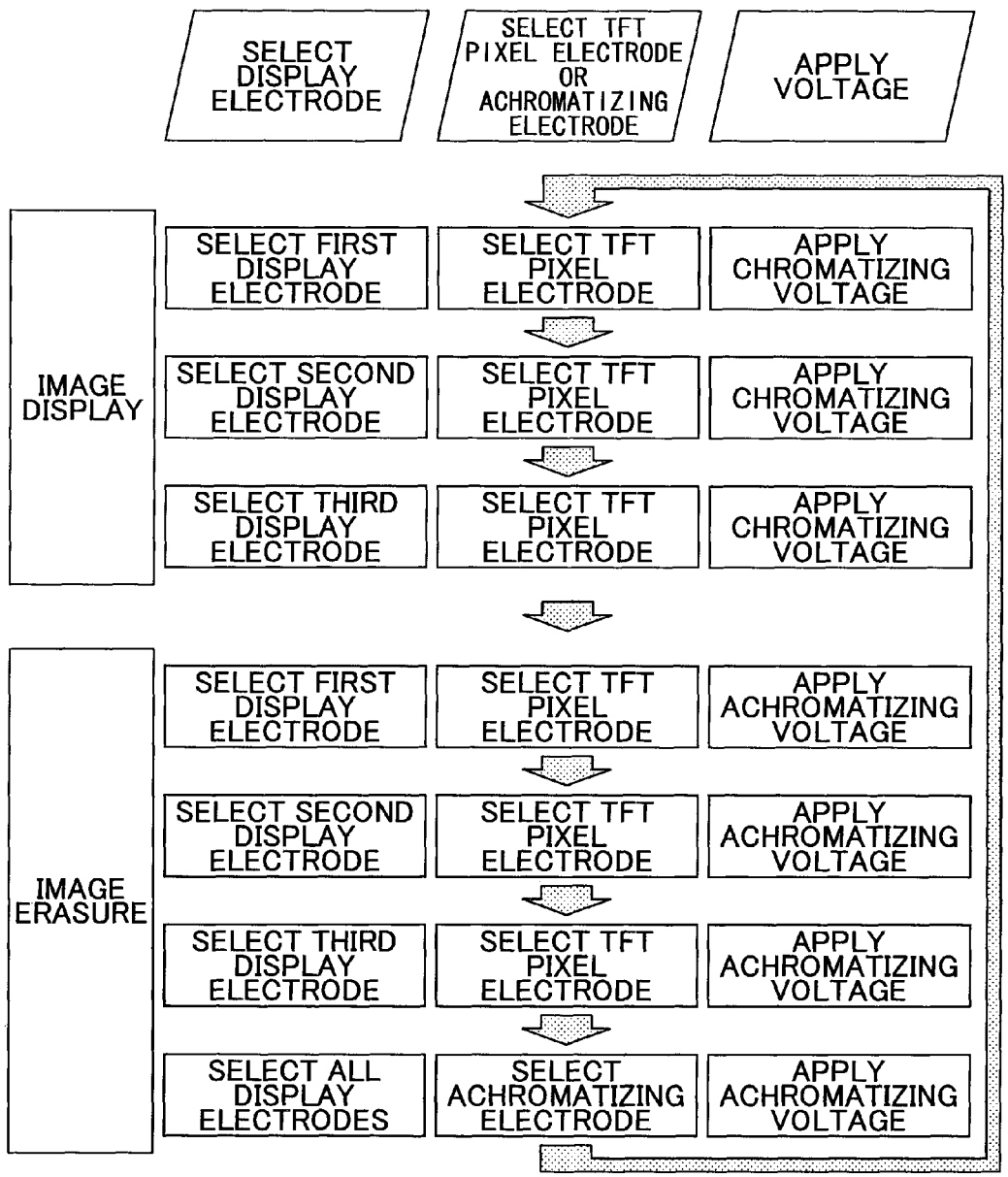
FIG. 10 is a flow diagram illustrating a fourth example of color developing and reducing driving of image display and image erasure by the active drive display apparatus configured using the electro-chromic display element according to the present invention.

In the image erasure (color reducing driving) in FIG. 10, all the display electrodes and all the TFT pixel electrodes are successively selected and the achromatizing voltage is applied. Next, all of the display electrodes and the erasing electrode are collectively selected and the achromatizing voltage is applied.

Figure 11:
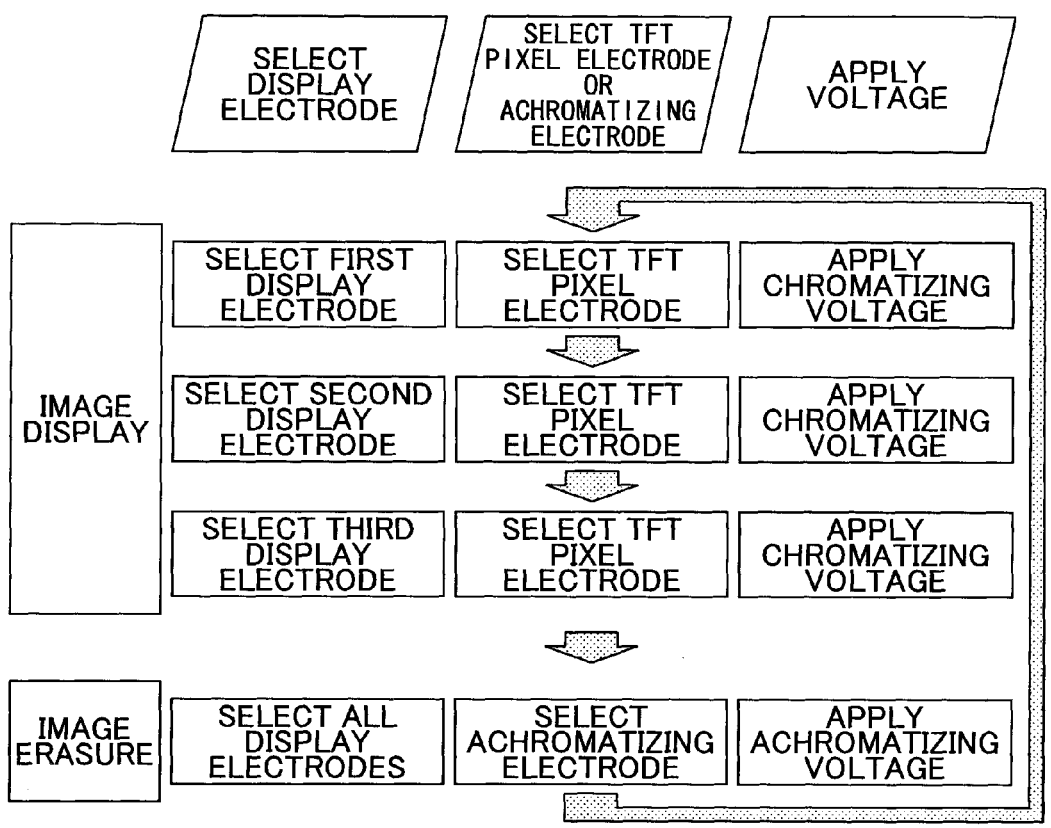
FIG. 11 is a flow diagram illustrating a fifth example of color developing and reducing driving of image display and image erasure by the active drive display apparatus configured using the electro-chromic display element according to the present invention.

In the image erasure (color reducing driving) in FIG. 11, all of the display electrodes and the erasure electrode are collectively selected and the achromatizing voltage is applied.

Figure 12:
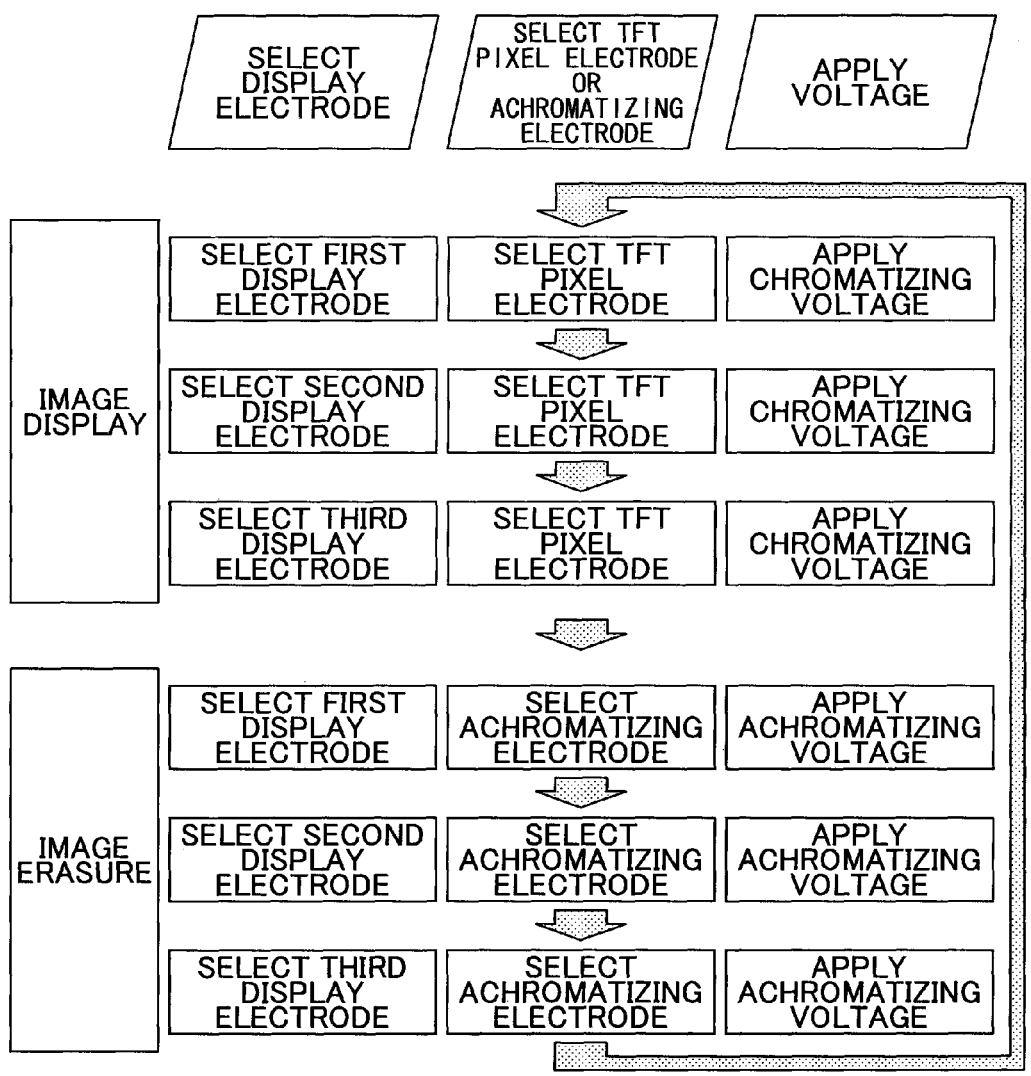
FIG. 12 is a flow diagram illustrating a sixth example of color developing and reducing driving of image display and image erasure by the active drive display apparatus configured using the electro-chromic display element according to the present invention.

In the image erasure (color reducing driving) in FIG. 12, besides selecting the erasing electrode, all of the display electrodes are successively selected and the achromatizing voltage is applied.

Figure 13:
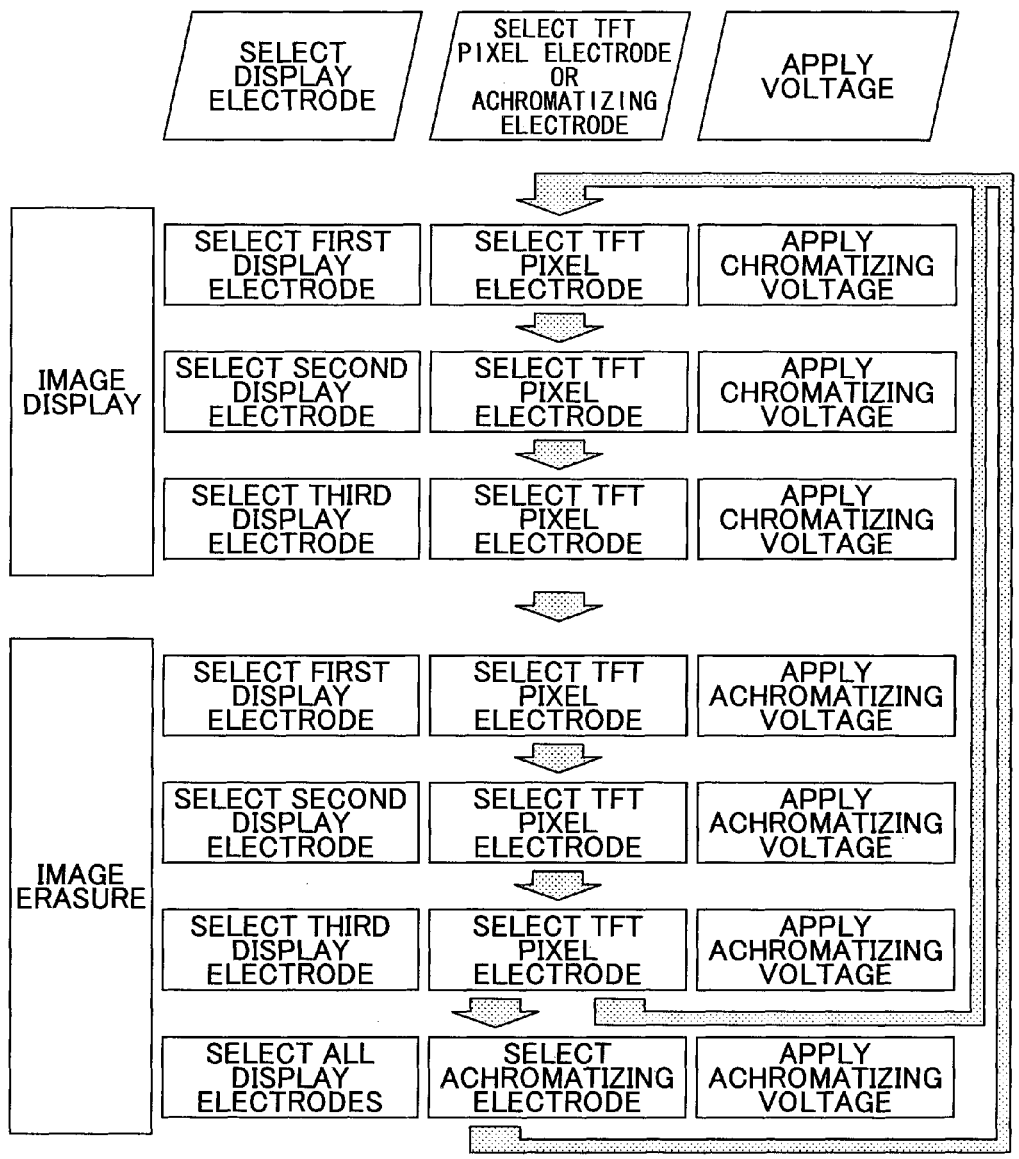
FIG. 13 is a flow diagram illustrating a seventh example of color developing and reducing driving of image display and image erasure by the active drive display apparatus configured using the electro-chromic display element according to the present invention.
Figure 14:
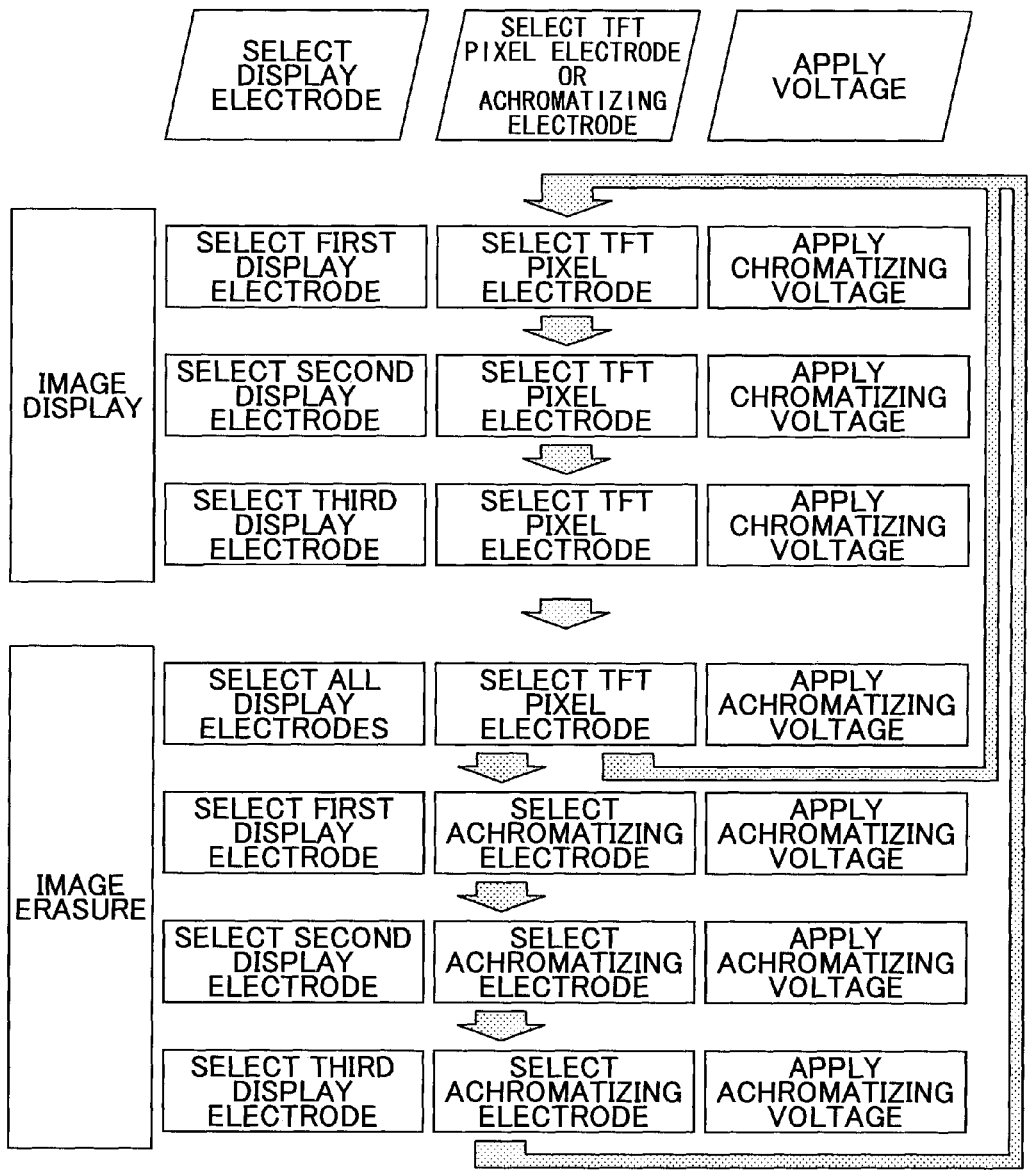
FIG. 14 is a flow diagram illustrating an eighth example of color developing and reducing driving of image display and image erasure by the active drive display apparatus configured using the electro-chromic display element according to the present invention.

While FIGS. 7-10 show flow diagrams in which successive erasing is done using both the combination which selected the pixel electrode and the combination which selected the erasing electrode, it may be set such that the achromatizing process using the erasing electrode is not performed each time of the image erasure, but is performed once every ten image erasures, or once every one hundred image erasures. The flow diagram then is shown in FIGS. 13 and 14.

EXAMPLES

Below, examples of the present invention are explained.

Example 1

Manufacturing of Electro-Chromic Display Element 10

(1) Preparation of Electrolytic Layer Precursor Material

As an electrolyte, carbonic acid propylene solution (TBAP, concentration 2 mol/l) of perchloric acid tetra butyl ammonium was prepared as an electrolyte. Then, as an electrolyte layer precursor material, a mixture (a product name: PNM-170) of a polymerization initiator, a monomer composition, and a liquid crystal composition for PNLC made by DIC Co., Ltd. were mixed with the above-described electrolyte. Here, it was adjusted such that the TBAP concentration becomes approximately 0.04 mol/l, and then, in addition, pearl-shaped resin beads of particle size 10 μm were dispersed in the electrolyte layer precursor material at the 0.2 wt % concentration in order to specify a layer thickness of the electrolyte layer 4 to be manufactured.

(2) Manufacturing of Display Electrode 1, Electro-Chromic Layer 3

An ITO film of a thickness of 100 nm is formed by sputtering on the whole face on a glass substrate (a display substrate 1b) of 40 mm×40 mm, and the display electrode 1 is manufactured. The resistance between the electrode ends was approximately 200 ohms. Thereon a titanium oxide nano-particle dispersed solution (a product name SP210; manufactured by Showa Titanium Co., Ltd) is spin coated, and an annealing process is performed for 15 minutes at 120° C. to form a titanium oxide particle film, and thereon a 1 wt % 2,2,3,3-tetrafluoropropanol (below-called TFP) solution of 4,4'-(isooxazole-3,5-diyl)bis(1-(2-phosphonoethyl)pyridinium)bromide, which is an electro-chromic compound is spin coated, and an annealing process is performed for 10 minutes at 120° C. to form an electro-chromic layer 3, which includes the electro-chromic compound and the titanium oxide particles.

(3) Manufacturing of Opposing Electrode 2, White Reflective Layer 6, and Erasing Electrode 5

An ITO film with a thickness of 100 nm is formed as the opposing electrode 2 in a stripe shape on a glass substrate (an opposing substrate 2b) of 40 mm×40 mm. Thereon, a TFP dispersed solution of titanium oxide and aqueous polyurethane resin is spin coated, and an annealing process is performed for 10 minutes at 120° C. to form the white reflective layer 6. Thereon an ITO film with a thickness of 100 nm is formed by sputtering to manufacture the erasing electrode 5.

(4) Manufacturing of Electro-Chromic Display Element 10

The electrolyte layer precursor material prepared in item (1) is applied onto the display electrode 1 and the electro-chromic layer 3 that were manufactured in item (2). Then, the opposing electrode 2, the white reflective layer 6, and the erasing electrode 5 that were manufactured in item (3) are overlapped, and ultraviolet rays (irradiation light strength 50 mW/cm$^2$) around the wavelength 365 nm center are irradiated from the opposing electrode 2 side with a high pressure mercury lamp for two minutes, and photopolymerization-induced phase separation is performed to manufacture the electro-chromic display element 10 via the electrolyte layer 4.

Checking of Color Developing/Reducing Operations

When a voltage 6 V is applied with a negative pole connected to the display electrode 1 side of the electro-chromic display element 10 manufactured in item (4) and a positive pole connected to the opposing electrode 2 side, the electro-chromic layer 3 of the display electrode 1 developed a blue color in line with the shape of the ITO stripe-pattern opposing electrode 2 of the opposing substrate 2b. The reaction occurred at high speed in approximately 500 ms. Next, when a voltage −6 V is applied with a positive pole connected to the display electrode 1 side and a negative pole connected to the opposing electrode 2 side, the color reduced at high-speed in approximately 500 ms.

Occurrence of "Incomplete Color Reduction" and Color Reducing

When the operations of color developing and reducing that were performed in the previous item were repeated 100 times, an incomplete color reducing occurred in a gap between the opposing electrode 2 and an stripe-shaped opposing electrode 2, with the incomplete color reducing remaining even after only the color reducing operation is repeated several times. Here, when a voltage of −6 V is applied with the negative pole connected to the display electrode 1 side and the positive pole connected to the erasing electrode 5, the incomplete color reducing disappeared clearly.

Example 2

Manufacturing of Electro-Chromic Display Element 20

(1) Preparation of Electrolytic Layer Precursor Material

As an electrolyte, carbonic acid propylene solution (TBAP, concentration 2 mol/l) of perchloric acid tetra butyl ammonium was prepared as an electrolyte. Then, as an electrolyte layer precursor material, a mixture (a product name: PNM-170) of a polymerization initiator, a monomer composition, and a liquid crystal composition for PNLC made by DIC Co., Ltd. were mixed with the above-described electrolyte. Here, it was adjusted such that the TBAP concentration becomes approximately 0.04 mol/l, and then, in addition, pearl-shaped resin beads of particle diameter 10 μm were dispersed in the electrolyte layer precursor material at the 0.2 wt % concentration in order to specify a layer thickness of the electrolyte layer 4 to be manufactured.

(2) Manufacturing of Display Electrode 1, Electro-Chromic Layer 3, White Reflective Layer 6, and Erasing Electrode 5

An ITO film of a thickness of 100 nm is formed by sputtering on the whole face on a glass substrate (a display substrate 1*b*) of 40 mm×40 mm, and the display electrode 1 is manufactured. The resistance between the electrode ends was approximately 200 ohms. Thereon a titanium oxide nanoparticle dispersed solution (a product name SP210; manufactured by Showa Titanium Co., Ltd.) is spin coated, and an annealing process is performed for 15 minutes at 120° C. to form a titanium oxide particle film, and thereon a 1 wt % 2,2,3,3-tetrafluoropropanol (below-called TFP) solution of 4,4'-(isooxazole-3,5-diyl)bis(1-(2-phosphonoethyl)pyridinium)bromide, which is an electro-chromic compound is spin coated, and an annealing process is performed for 10 minutes at 120° C. to form an electro-chromic layer 3, which includes the electro-chromic compound and the titanium oxide particles. Thereon, a TFP dispersed solution of titanium oxide and aqueous polyurethane resin is spin coated, and an annealing process is performed for 10 minutes at 120° C. to form the white reflective layer 6. Then, thereon an ITO film with a thickness of 100 nm is formed by sputtering to manufacture the erasing electrode 5.

(3) Manufacturing of the Opposing Electrode 2

An ITO film with a thickness of 100 nm is formed as the opposing electrode 2 in a stripe shape on a glass substrate (an opposing substrate 2*b*) of 40 mm×40 mm.

(4) Manufacturing of Electro-Chromic Display Element 20

The electrolyte layer precursor material prepared in item (1) is applied onto the display electrode 1, the electro-chromic layer 3, the white reflective layer 6, and the erasing electrode 5 that were manufactured in item (2). Then, the opposing electrodes 2 that were manufactured in item (3) are overlapped, and ultraviolet rays (irradiation light strength 50 mW/cm$^2$) with the wavelength 365 nm center are irradiated from the opposing electrode 2 side with a high pressure mercury lamp for two minutes, and photopolymerization-induced phase separation is performed to manufacture the electro-chromic display element 20 through the electrolyte layer 4.

Checking of Color Developing/Reducing Operations

When a voltage 6 V is applied with a negative pole connected to the display electrode 1 side of the electro-chromic display element 20 manufactured in item (4) and a positive pole connected to the opposing electrode 2 side, the electro-chromic layer 3 of the display electrode 1 developed a blue color in line with the shape of the ITO stripe-pattern opposing electrode 2 of the opposing substrate 2*b*. The reaction occurred at high-speed in approximately 500 ms. Next, when a voltage −6 V is applied with a positive pole connected to the display electrode 1 side and a negative pole connected to the opposing electrode 2 side, the color reduced at high speed in approximately 500 ms.

Occurrence of Incomplete Color Reduction and Color Reducing

When the operations of color developing and reducing that were performed in the previous item were repeated 100 times, an incomplete color reducing occurred in a gap between the opposing electrode 2 and a stripe-shaped opposing electrode 2, with the incomplete color reducing remaining even after how many times only the color reducing operation is repeated. Here, when a voltage of −6 V is applied with the negative pole connected to the display electrode 1 and the positive pole connected to the erasing electrode 5, the incomplete color reducing disappeared clearly.

Example 3

Manufacturing of Electro-Chromic Display Element 30

(1) Preparation of Electrolytic Layer Precursor Material

As an electrolyte, carbonic acid propylene solution (TBAP, concentration 2 mol/l) of perchloric acid tetra butyl ammonium was prepared as an electrolyte. Then, as an electrolyte layer precursor material, a mixture (a product name: PNM-170) of a polymerization initiator, a monomer composition, and a liquid crystal composition for PNLC made by DIC Co., Ltd. were mixed with the above-described electrolyte, Here, it was adjusted such that the TBAP concentration becomes approximately 0.04 mol/l, and then, in addition, pearl-shaped resin beads of particle diameter 10 μm were dispersed to the electrolyte layer precursor material at the 0.2 wt % concentration in order to specify a layer thickness of the electrolyte layer 4 to be manufactured.

(2) Manufacturing of Display Electrode, Electro-Chromic Layer

An ITO film of a thickness of 100 nm is formed by sputtering on a predetermined region on a glass substrate (a display substrate 1*b*), and a first display electrode 1C is manufactured. The sheet resistance is approximately 200 ohms. Thereon a titanium oxide nanoparticle dispersed solution (a product name SP210; manufactured by Showa Titanium Co., Ltd) is spin coated, and an annealing process is performed for 15 minutes at 120° C. to form a titanium oxide particle film, and further thereon a 1 wt % TFP solution of 4,4'-(isooxazole-3,5-diyl)bis(1-(2-phosphonoethyl)pyridinium)bromide, which is an electro-chromic compound, is spin coated, and an annealing process is performed for 10 minutes at 120° C. to form a first electro-chromic layer 3C, which includes the electro-chromic compound and the titanium oxide particles.

Next, thereon 0.1 wt % ethanol solution of poly N vinyl amide and a 0.5 wt % aqueous solution of polyvinyl alcohol is applied by a spin coating method to form a protective layer and then a film of ZnS—SiO$_2$, having the composition ratio at 8:2, is formed by sputtering such that the thickness of the film becomes 140 nm to form the insulating layer 7.

Moreover, thereon an ITO film is formed by sputtering such that the thickness of the film becomes 100 nm to form a second display electrode 1M. The sheet resistance is approximately 200 ohms. Thereon, a titanium oxide nanoparticle dispersed solution (a product name SP210; manufactured by Showa Titanium Co., Ltd.) is spin coated, and an annealing process is performed for 15 minutes at 120° C. to form a titanium oxide particle film, and then a 1 wt % TFP solution of 4,4'-(1-phenyl-1H-pyrrole-2,5-diyl)bis(1-(4-(phosphonomethyl)benzyl)pyridinium)bromide, which is an electro-chromic compound is applied by a spin coating method, and an annealing process is performed for 10 minutes at 120° C. to form a second electro-chromic layer 3M, which includes the electro-chromic compound and the titanium oxide particles.

Next, thereon 0.1 wt % ethanol solution of poly N vinyl amide and 0.5 wt % aqueous solution of polyvinyl alcohol is applied by a spin coating method to form a protective layer and then a film of ZnS—SiO$_2$, having the composition ratio at 8:2, is formed by sputtering such that the thickness of the film becomes 140 nm to form the insulating layer 7.

Moreover, thereon an ITO film is formed by sputtering such that the thickness of the film becomes 100 nm to form a third display electrode 1Y. The sheet resistance is approximately 200 ohms. Thereon, a titanium oxide nanoparticle dispersed solution (a product name SP210; manufactured by Showa Titanium Co., Ltd) is applied by a spin coating method, and an annealing process is performed for 15 minutes at 120° C. to form a titanium oxide particle film, and then a 1 wt % TFP solution of 4,4'-(4,4'-(1,3,4-oxadiazole-2,5-diyl)bis(4,1-phenylene))bis(1-(8-phosphonooctyl)pyridinium)bromide, which is an electro-chromic compound, is applied by the spin coating method, and an annealing process is performed for 10 minutes at 120° C. to form a third electro-chromic layer 3Y, which includes the electro-chromic compound and the titanium oxide particles.

(3) Manufacturing of Opposing Electrode 2, White Reflective Layer 6, and Erasing Electrode 5

TFP dispersed solution of aqueous polyurethane resin and titanium oxide is spin coated on the opposing electrode 2, which is a pixel electrode, and multiple driving elements $2_{TFT}$ (140 ppi) formed on the glass substrate (opposing substrate 2b) is spin coated and an annealing process is performed for ten minutes at 120° C. to form a white reflective layer 6, and then thereon an ITO film with the thickness of 100 nm is formed by sputtering and the erasing electrode 5 is formed.

(4) Manufacturing of Electro-Chromic Display Element 30

The electrolyte layer precursor material prepared in item (1) is applied onto the members manufactured in item (2). Then, the opposing electrode 2, the white reflective layer 6, and the erasing electrode 5 that are manufactured in item (3) are overlapped, and ultraviolet rays (irradiation light strength 50 mW/cm$^2$) around the wavelength 365 nm center are irradiated from the opposing electrode 2 side with a high pressure mercury lamp for two minutes, and photopolymerization-induced phase separation is performed to manufacture the electro-chromic display element 30 through the electrolyte layer 4.

Checking of Color Developing/Reducing Operation

When the driving element $2_{TFT}$ of the electro-chromic display element 30 manufactured in item (4) is driven, the respective first, second, and third electro-chromic display layers (in other words, a layer structure of the first display electrode 1C and the first electro-chromic layer 3C, a layer structure of the second display electrode 1M and the second electro-chromic layer 3M, and a layer structure of the third display electrode 1Y and the third electro-chromic layer 3Y) display corresponding images, so that clear color images were obtained. The time from starting driving to when the images were obtained was approximately 500 milliseconds. Moreover, the time required to erase the image was also approximately 500 milliseconds.

Occurrence of Incomplete Color Reduction and Color Reducing

After the color images in the previous item were displayed, various images of varying colors were displayed one after another. After the displaying was continued for 10 minutes, incomplete color reducing occurred between pixels (or opposing electrodes 2). Even when an achromatizing voltage of −6.5 V is applied between the first display electrode 1C and the erasing electrode 5 and then the achromatizing voltage of −6.5 V is applied between the second display electrode 1M and the erasing electrode 5, and then the achromatizing voltage of −6.5 V is applied between the third display electrode 1Y and the erasing electrode 5 to seek to provide a white display of the whole face (erasing of all the pixels), the white display was not obtained due to the incomplete color reducing. When a spectrum colorimeter is used to measure reflectance at 550 nm with a spot size of 5×8 mm for the display element of this state, it was 31.8%. Such a state is said to be a displaying state of the display element of the related-art configuration that has no achromatizing electrode, which is a feature of the present invention. Next, when an achromatizing voltage −6.5 V is applied relative to the erasing electrode 5 by connecting the first display electrode 1C, the second display electrode 1M, and the third display electrode 1Y, the above-described incomplete color reducing disappeared clearly, so that a white display was obtained.

When a spectrum colorimeter was used to measure reflectance at 550 nm with a spot size of 5×8 mm, it was 60.3% for the display element in the previously-described state. It was confirmed that the erasing step using an erasing electrode which is the feature of the present invention causes the reflectance to increase dramatically.

The present invention has been described with the embodiments shown in the drawings. However, the present invention is not limited to those embodiments shown therein. Thus, modifications may be made thereto within the scope a skilled person would have arrived at, such as other embodiments, additions, changes, deletions, etc, and are to be included in the scope of the present invention as long as they achieve the operation and advantages of the present invention in any of the modes thereof.

The present application is based on and claims the benefit of priority of Japanese Patent Application No. 2011-121400 filed on May 31, 2011 and Japanese Patent Application No. 2012-039801 filed on Feb. 27, 2012.

The invention claimed is:

1. A display apparatus comprising:
   an electro-chromic display element, comprising:
      at least a display substrate;
      one or more display electrodes provided on the display substrate;
      an electro-chromic a er provided on the display electrode;
      an opposing substrate;
      multiple opposing electrodes which are provided on the opposing substrate and which are arranged to oppose the display electrode; and
      an electrolytic layer provided such that it is placed between the display electrode and the multiple opposing electrodes, the electro-chromic display element further including a third electrode which is placed between the display electrode and the multiple opposing electrodes and which is arranged such that the electro-chromic layer is placed between the third electrode and the display electrode,
      multiple driving elements provided on the opposing substrate in correspondence with the respective multiple opposing electrodes,
      wherein a layer structure combining the display electrode and the electro-chromic layer is laminated on the display electrode in a multiple number;
   a unit which selects the one or more display electrodes;
   a unit which variably selects one of the third electrode and the multiple opposing electrodes; and
   a unit which applies a voltage between the selected display electrode and the selected one of the third electrode and the multiple opposing electrodes.

2. The display apparatus as claimed in claim 1, wherein the third electrode is arranged across the multiple opposing electrodes.

3. The display apparatus as claimed in claim 1, wherein an erasing operation is performed which applies a voltage between the display electrode and the third electrode, the voltage causing color reducing of the electro-chromic layer.

4. The display apparatus as claimed in claim 1, wherein the electro-chromic display element further comprises a white reflective layer in the electrolytic layer.

5. A display apparatus, comprising:
an electro-chromic display element, comprising:
at least a display substrate;
one or more display electrodes provided on the display substrate;
an electro-chromic layer provided on the display electrode, an opposing substrate;
multiple opposing electrodes which are provided on the opposing substrate and which are arranged to oppose the display electrode;
an electrolytic layer provided such that it is placed between the display electrode and the multiple opposing electrodes, the electro-chromic display element further including a third electrode which is placed between the display electrode and the multiple opposing electrodes and which is arranged such that be electro-chromic layer is placed between the third electrode and the display electrode; and
a white reflective layer in the electrolytic layer;
a unit which selects the one or more display electrodes;
a unit which variably selects one of the third electrode and the multiple opposing electrodes; and
a unit which applies a voltage between the selected display electrode and the selected one of the third electrode and the multiple opposing electrodes.

6. A method of driving the display apparatus as claimed in claim 5, comprising the steps of:
selecting the one or more display electrodes;
then selecting the multiple opposing electrodes and applying a voltage between the selected opposing electrodes and the selected one or more display electrodes, the voltage causing color reducing of the electro-chromic layer corresponding to the selected one or more display electrodes; and
further selecting the third electrode and applying a voltage between the selected third electrode and the selected one or more display electrodes, the voltage causing color reducing of the electro-chromic layers corresponding to the selected one or more display electrodes.

7. The display apparatus as claimed in claim 5, wherein an erasing operation is performed which applies a voltage between the display electrode and the third electrode, the voltage causing color reducing of the electro-chromic layer.

* * * * *